United States Patent
Flum et al.

(10) Patent No.: US 7,928,313 B2
(45) Date of Patent: Apr. 19, 2011

(54) VARIABLE SLIPPAGE CONTROL FOR A DISC JOCKEY CONTROL SURFACE

(75) Inventors: Alan Flum, Ridgefield, WA (US); James Mazur, West Hollywood, CA (US)

(73) Assignee: Stanton Magnetics, Inc., Deerfield Beach, FL (US)

( * ) Notice: Subject to any disclaimer, the term of this patent is extended or adjusted under 35 U.S.C. 154(b) by 163 days.

(21) Appl. No.: 12/456,975

(22) Filed: Jun. 25, 2009

(65) Prior Publication Data

US 2009/0320670 A1    Dec. 31, 2009

Related U.S. Application Data

(63) Continuation-in-part of application No. 11/586,903, filed on Oct. 26, 2006, now Pat. No. 7,566,827.

(51) Int. Cl.
    *G10H 1/00* (2006.01)
    *G10H 3/00* (2006.01)
(52) U.S. Cl. .............. 84/723; 84/600; 369/264
(58) Field of Classification Search ........... 84/723, 84/600; 369/264
    See application file for complete search history.

(56) References Cited

U.S. PATENT DOCUMENTS

| | | | |
|---|---|---|---|
| 6,541,690 B1 * | 4/2003 | Segers, Jr. | 84/605 |
| 6,985,418 B2 | 1/2006 | Hori | |
| 7,087,830 B2 * | 8/2006 | Kent et al. | 84/645 |
| 7,566,827 B2 * | 7/2009 | Mazur et al. | 84/723 |
| 2005/0052981 A1 * | 3/2005 | Shim et al. | 369/59.26 |
| 2007/0079315 A1 * | 4/2007 | Mittersinker | 720/656 |
| 2008/0062560 A1 * | 3/2008 | Mazur et al. | 360/135 |
| 2008/0148922 A1 * | 6/2008 | Morra | 84/600 |
| 2010/0020673 A1 * | 1/2010 | Flum et al. | 369/264 |
| 2010/0080109 A1 * | 4/2010 | Flum et al. | 369/264 |

* cited by examiner

*Primary Examiner* — Jeffrey Donels
(74) *Attorney, Agent, or Firm* — Stone Creek, LLC; Alan M. Flum

(57) ABSTRACT

The disclosure pertains to a scratch effect controller for use by a disk jockey, wherein at least one electromagnet creates the slippage tension or friction effect between the user manipulated disc, which includes a vinyl-like surface thereby simulating a vinyl record, and the rotatable or fixed platter. The strength of the electromagnet is variable so as to create a variable slippage tension or friction effect.

13 Claims, 11 Drawing Sheets

VARIABLE SLIPPAGE CONTROL FOR A DISC JOCKEY CONTROL SURFACE

This application is a continuation-in-part of U.S. patent application Ser. No. 11/586,903, filed on Oct. 26, 2006 now U.S. Pat. No. 7,566,827. The entire contents of U.S. patent application Ser. No. 11/586,903 are hereby incorporated by reference.

BACKGROUND OF THE INVENTION

1. Field of the Invention

The present invention pertains to a device for use by a disk jockey, wherein electromagnets create the variable slippage tension or friction effect between the user manipulated vinyl-like surface (simulating a vinyl record) and the platter, which may be rotatable or fixed.

2. Description of the Prior Art

Disk jockeys (DJs) traditionally entertain their audiences by manipulating the speed and direction of a vinyl record used on phonographic turntables to produce various effects including the well known "scratch effect". The turntable has been replaced by CD players that have jog wheels in the form of a turntable like platters that can be turned by the DJ to produce the scratch effect and simulate other characteristics of manipulating a vinyl record on a traditional phonographic turntable.

An improvement on this is to rotate the platter by means of a motor and to provide a separate vinyl-like surface that the user manipulates. Between the motorized platter and vinyl-like surface is a slip disc made of plastic or felt. As the DJ moves the vinyl record-like surface, the slip disc allows the user to move the record independently of the rotating platter. U.S. Pat. No. 6,985,418 entitled "Optical Disk Reproducing Apparatus" to Hori teaches a device that includes an optical disc player, a user manipulated surface and driven rotating surface where there is some type of encoding mechanism to detect the speed and direction of both the user surface and the rotating surface.

The next evolution beyond the moving platter CD player for DJs is the moving platter computer interface control surface. Many DJs desire to use a phonographic turntable-like control surface to manipulate music on their computer. U.S. Pat. No. 6,541,690 entitled "Scratch Effect Controller" to Segers, for example, teaches such a device that manipulates an audio stream on a personal computer using a device that includes a rotating platter, a user manipulated surface (encoder disc), and a slip disc.

One problem with this combination of motorized platter and vinyl-like surface is cost. It is desirable to have a CD player with some of the characteristics of the vinyl-like surface and motorized platter without the platter being motorized.

Another problem not addressed by any of the prior art is the fact that each user may have a different preference as to the feel of the slippage between the vinyl-like record and the rotating platter. On a traditional phonographic turntable, the user may choose from different various slip discs made from a variety of different materials. This does not always produce the most desirable results. All of the above motorized and non-motorized CD players and DJ control surfaces have a similar limitation.

OBJECTS AND SUMMARY OF THE INVENTION

It is therefore an object of the present invention to provide a device for a disk jockey to create audio effects with a CD player, such as a scratch effect controller, wherein the slippage between the user-manipulated surface and the rotatable or fixed platter is varied by a variable slippage control. These and other objects are attained by providing a scratch effect controller with electromagnets to create the variable slippage tension between the user manipulated surface and the rotatable or fixed platter.

BRIEF DESCRIPTION OF THE DRAWINGS

Further objects and advantages of the invention will become apparent from the following description and from the accompanying drawings, wherein.

DETAILED DESCRIPTION OF THE PREFERRED EMBODIMENT

Figure 1:
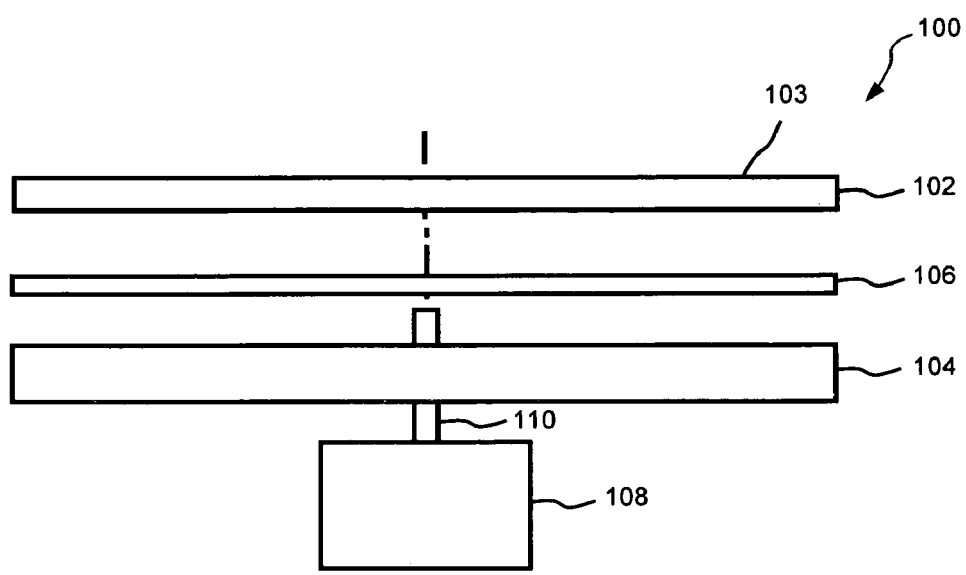
FIG. 1 is a partially exploded schematic of a CD player with a user manipulated surface and a rotating platter, such as is taught in the prior art.

Referring now to the drawings in detail wherein like numerals indicate like elements throughout the several views, one sees that FIG. 1 discloses a typical scratch effect controller 100 of the prior art wherein a user manipulated disc 102 includes an upper surface 103 which simulates a vinyl record. User manipulated disc 102 is mounted on a motor-driven rotating platter 104 with a slip disc or resin sheet 106 there between. The slip disc or resin sheet 106 provides for reduced friction between the user manipulated surface 102 and the motor-driven rotating platter 104. Motor 108 drives shaft 110 in concert therewith which drives motor-driven rotating platter 104. Shaft 110 further extends upwardly from motor-driven rotating platter 104 thereby providing an axis to pass through the central apertures (not shown) of user manipulated surface 102 and slip disc or resin sheet 106. A sensor (not shown) detects the movements of user manipulated surface 102.

Figure 2:
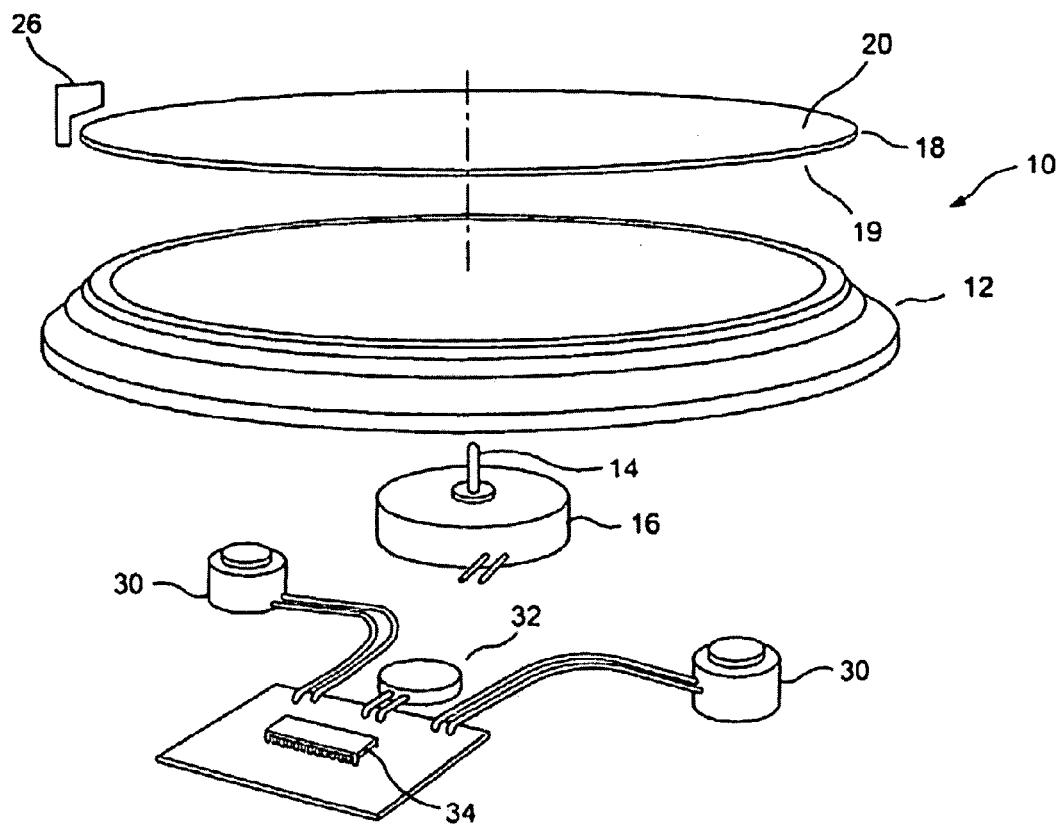
FIG. 2 is a partially exploded perspective view of an embodiment of the scratch controller of the present invention.

The scratch controller 10 of the present invention is illustrated in FIG. 2. Rotating platter 12 is mounted on shaft 14 and typically moves in concert therewith. Shaft 14 may be driven by optional motor 16 or journaled for free rotation. User manipulated disc 18 is supported by and coaxial with rotating platter 12 (rotating platter 12 may have an upwardly extending spindle, not shown, much like a conventional turntable, to receive the central aperture 22 of user manipulated disc 18 shown in FIG. 3). User manipulated disc 18 is made of magnetic material, such as steel, or contains magnetic material, such as pressed vinyl permeated with small particles of magnetic material. Alternately, the surface could be made from injection molded plastic permeated with small particles of ferrous material during the molding process. Typically, the lower surface 19 of user manipulated disc is coated with a low friction material, such as Teflon (polytetrafluoroethylene). The rotating platter 12 typically has substantial rotational inertia so that when optional motor 16 is omitted or is turned off the user can manually initiate rotational motion of rotating platter 12 and subsequently vary the rotational speed of user manipulated disc 18 so as to be different from that of rotating platter 12.

Figure 3:
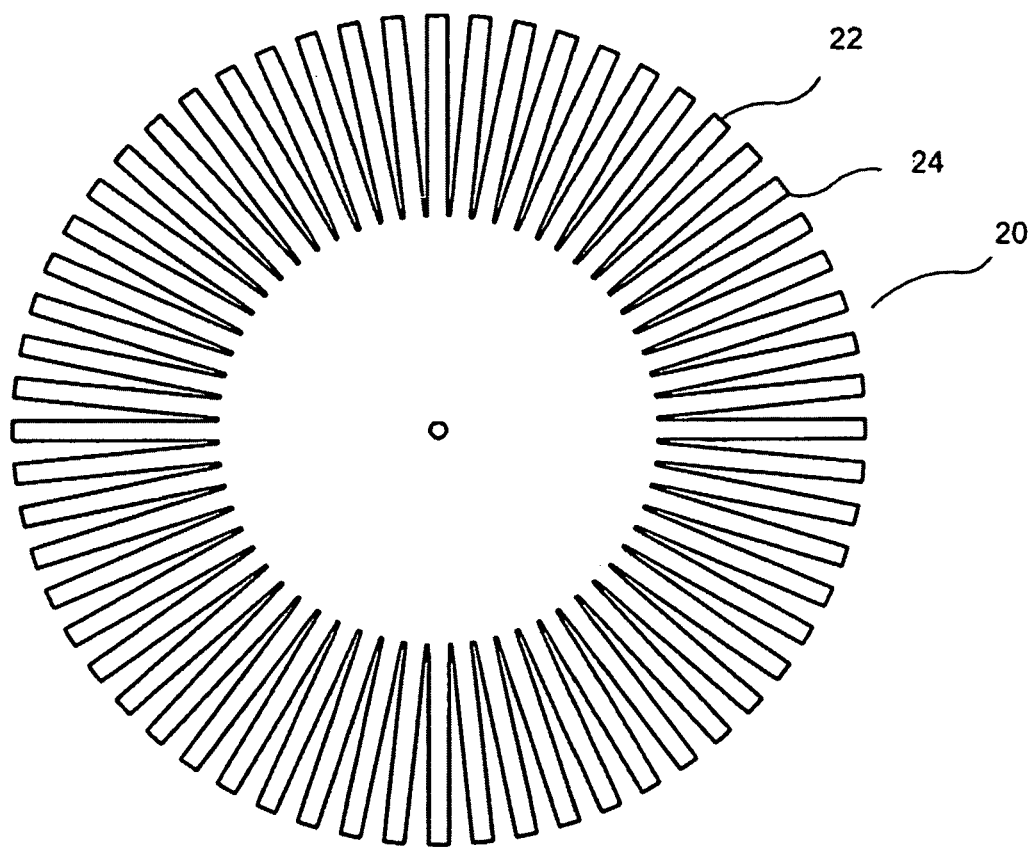
FIG. 3 is a possible embodiment of the encoding pattern on the upper surface of the user manipulated disc.

User manipulated disc 18 has an upper surface 20 which simulates the feel of a vinyl record. Upper surface 20 further typically includes a central aperture 22 (see FIG. 3). Upper surface 20 further includes encoding pattern 24, such as is shown in FIG. 3. The typical encoding pattern shown in FIG. 3 is that disclosed in U.S. Pat. No. 6,541,690 entitled "Scratch Effect Controller" issued on Apr. 1, 2003 to Segers, the entire contents of which are hereby incorporated by reference. Those skilled in the art will recognize a broad range of equivalents after review of the present disclosure.

Optical pick up 26 reads the rotating encoding pattern 24 of upper surface 20 of user manipulated disc 18 and transmits the data to a digital system such as that disclosed in the above identified U.S. Pat. No. 6,541,690 thereby controlling the playback of digitally encoded music in response to the movements of the user manipulated disc 18. The scratch effect may be proportional to the difference between the rotational velocity and a reference rotational velocity (such as that corresponding to 33⅓ rpm) or, particularly in the case of the rotating platter 12 not being driven by motor 16, the rotational acceleration of user manipulated disc 18 (deceleration being negative acceleration).

Electromagnets 30 are mounted in a stationary position below rotating platter 12 for increasing a force between the user manipulated disc 18 (which is attracted to the electromagnets) and the rotating platter 12. The strength of electromagnets 30 is adjustable to vary the friction between rotating platter 12 and user manipulated disc 18. The circuitry for adjusting the strength of electromagnets 30 is illustrated in FIG. 4.

Figure 4:
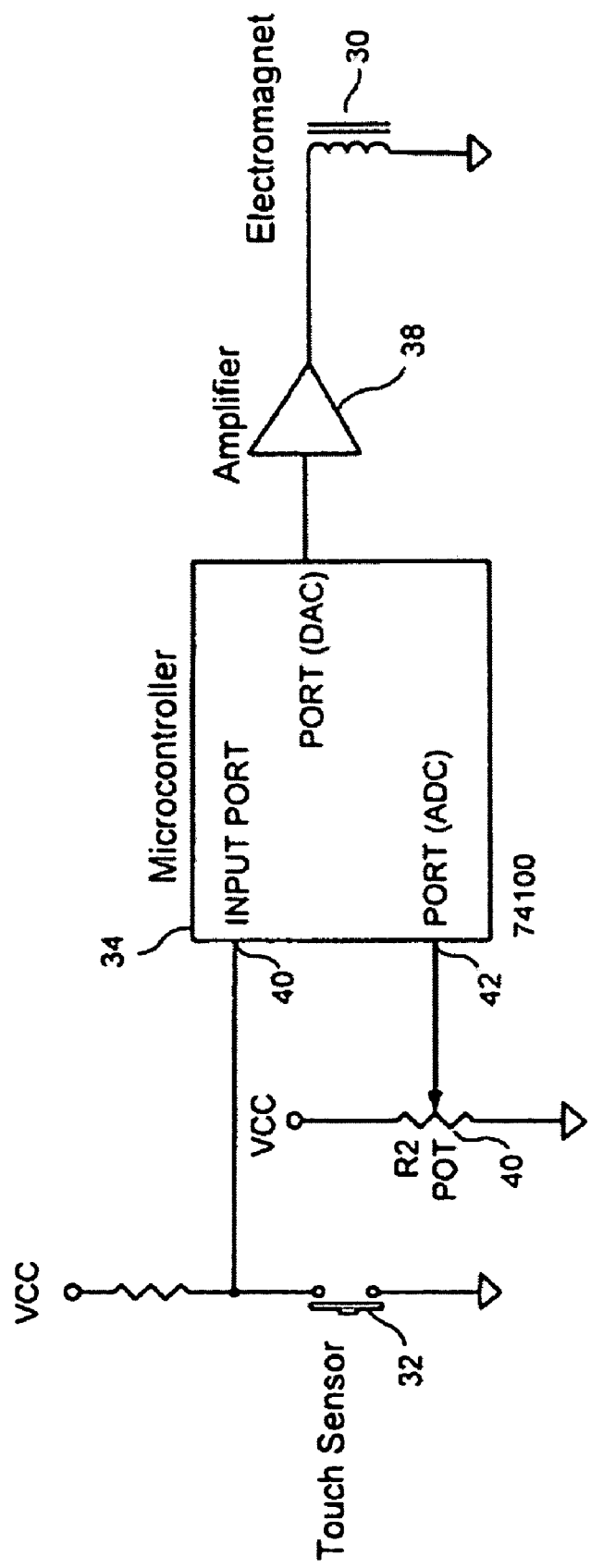
FIG. 4 is a schematic of the control section of the electromagnets of the present invention.

As shown in FIG. 4, detector 32 senses when the DJ or other user touches the user manipulated disc 18. Detector 32 typically could be a tact switch, capacitive detection, reed switch or some other means of touch sensing known to those skilled in the art of electronic design. Detector 32 connects to a microprocessor or microcontroller 34 either directly or through analog or digital circuitry depending on the type of detector. In this disclosed embodiment, tact switch 32 is connected to directly to an input port 36 of microcontroller 34.

Microcontroller 34 detects the switch closure, which represents the user touching the surface of the user manipulated disc 18.

Microcontroller acts upon the detection of the switch closure by sending a predetermined signal via an internal digital to analog converter or PWM circuit to the circuit that drives electromagnets 30. This driving circuit may be either an operational amplifier (illustrated as element 38, or transistor circuit, or any other means known to someone familiar with the art, capable of producing sufficient current to produce a strong enough magnetic field in the electromagnets 30 to create the effect of friction, or slippage tension, between the user manipulated disc 18 and rotating platter 12.

The friction can be adjusted by a user manipulated control such as a potentiometer, a switch, or series of switches. In the illustrated embodiment of FIG. 4, the user manipulated control is a potentiometer 40 which is connected to a port 42 of the microcontroller 34 which contains an analog to digital converter. The analog to digital converter creates a digital signal that corresponds to the position of the potentiometer 40 (i.e. the voltage on the output of the potentiometer). Microcontroller 34 uses this information to send out a predetermined signal to electromagnets 30 when the user manipulated disc 18 is touched (in this case, the tact switch 32 is closed).

Figure 5:
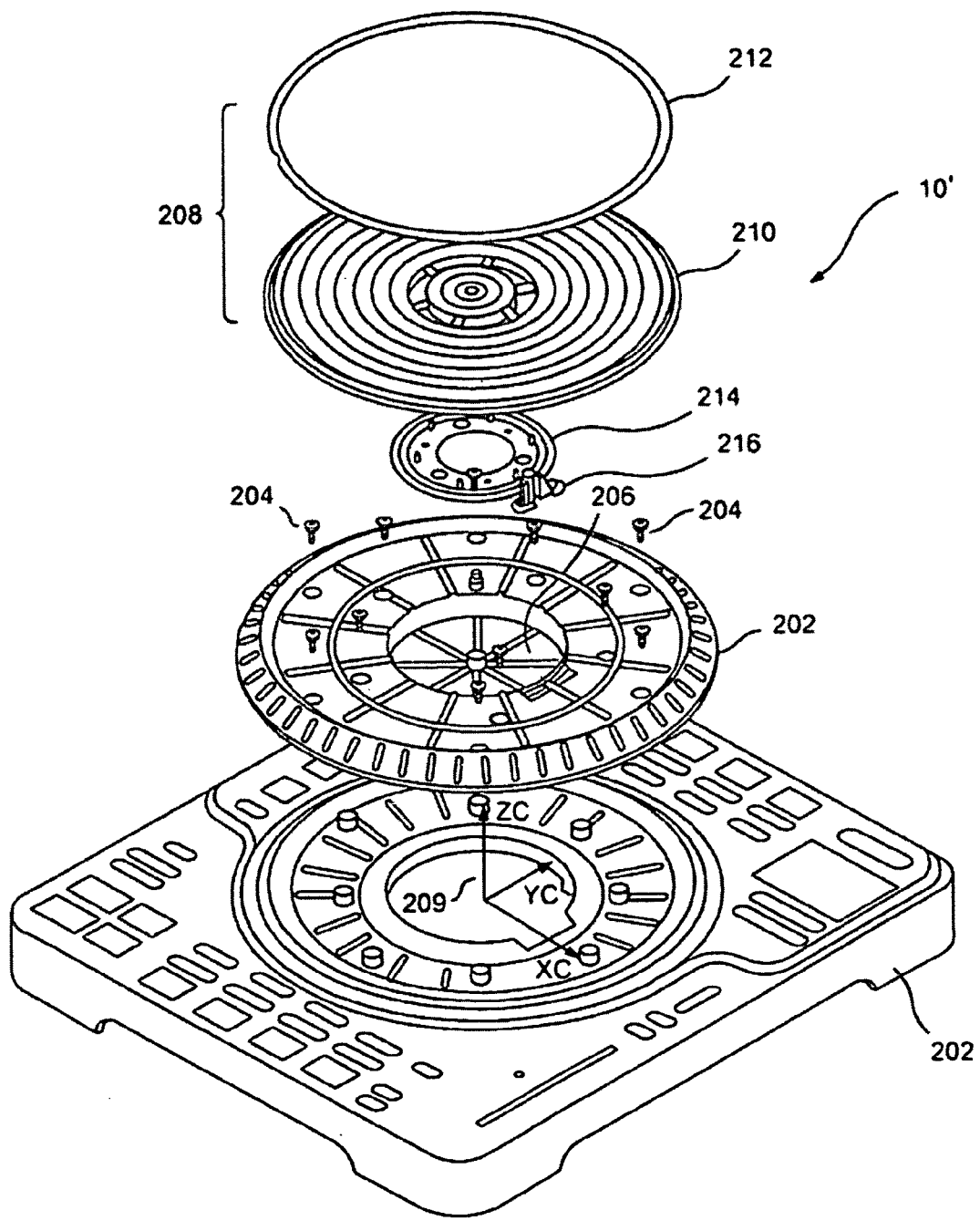
FIG. 5 is an exploded perspective view of an alternative embodiment of the scratch controller of the present invention including a fixed platter.

FIG. 5 is an exploded schematic of an alternative embodiment of the scratch controller 10 of the present invention. Scratch controller 10 includes a base 200 much like a conventional turntable. Platter 202 is fixed into place by screws 204 (or similar attachment devices or methods) on base 200 and does not rotate. Platter 204 includes central chamber 206 about the center thereof. User manipulated disc 208 rotates within platter 204 about an axis 209 and includes lower structural disc 210 and upper vinyl-like surface 212 glued thereto. The lower surface of user manipulated disc 208 may include polytetrafluoroethylene or a similar low friction material. Encoding disc 214 with encoding pattern is fixed to the underside of lower structural disc 210 and fits within central chamber 206 of fixed platter 204. Optical pick up 216 is secured to fixed platter 204 and measures the rotational velocity (from which rotational acceleration can be derived). Electromagnets (not shown) can be embedded in fixed platter 204 or inserted fixed underneath fixed platter 204 in order to perform the function of electromagnets 30 in FIG. 2. The electromagnets in this embodiment are driven by the circuit illustrated in FIG. 4 and described herein.

Figure 6:
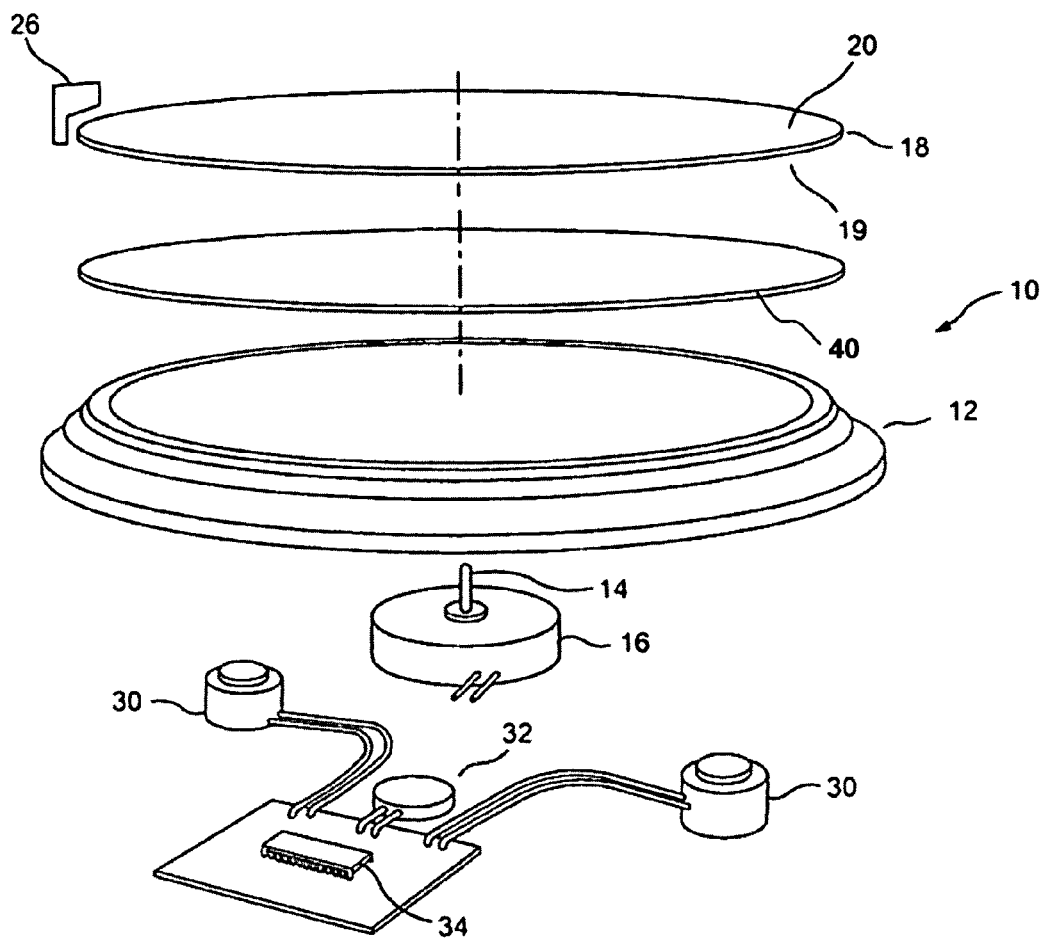
FIG. 6 is a partially exploded perspective view of an embodiment of the scratch controller of the present invention including a slip disc.

An alternative embodiment of the scratch controller shown in FIG. 2 and previously described is shown in FIG. 6. In this embodiment, a slip disc 40 is concentrically disposed against the upper surface of the rotating platter 12. The user manipulated disc 20 impinges against the upper surface of the slip disc 40. The electromagnets 30 increases the force of urging of the user manipulated disc 20 against the slip disc 40 and rotating platter 12. As a result, the friction between the user manipulated disc 20, slip disc 40, and rotating platter 12 is increased. The slip disc 40 is also commonly known as a slip mat. In this embodiment the slip disc 40 is made out a low static material. Suitable slip mat material is well known in the art of disc jockeying. Typically slip discs can be made of low static felt, cloth or thin plastic material.

Figure 7:
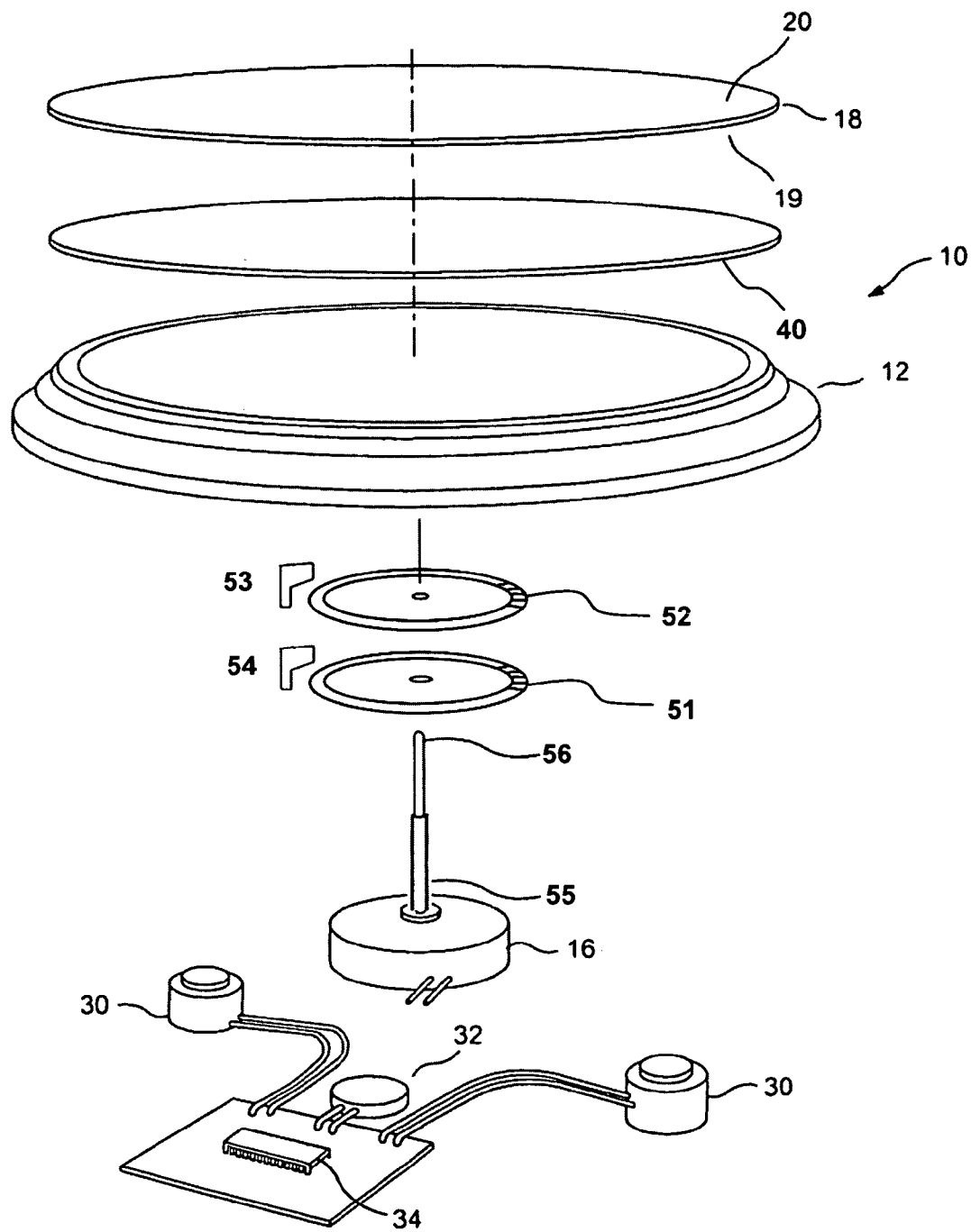
FIG. 7 is a partially exploded perspective view of an embodiment of the scratch controller of the present invention including an encoder disc operationally coupled to the user manipulated disc.

FIG. 7 is a partially exploded view of an embodiment of the present invention, which includes a slip disc 40 concentrically disposed against the upper surface of the rotating platter. The user manipulated disc 20 impinges against the upper surface of the slip disc 40 and the electromagnets 30 increases the force of urging of the user manipulated disc 20 against the slip disc 40 and rotating platter 12 as described previously. An optical encoder disc 52 is operationally coupled to the user manipulated disc. In this embodiment of the present invention, this is accomplished by mounting the encoder disc 52 on shaft 56. Shaft 56 is rotated by the user manipulated disc and is concentric to the motor shaft 55. The motor shaft rotates the rotating platter 12. In this embodiment of the present invention, a second optical encoder disc 51 is mounted on the motor shaft 55. A detector 53 reads the optical pattern of encoder 52 and creates an electrical signal corresponding to the direction and relative position of rotation of the encoder disc 52. This signal is typically a quadrature output but other suitable electrical signals that give both relative direction and position information are possible and well known to those familiar with the art. Similarly detector 54 reads the optical pattern of encoder 51 and creates an electrical signal corresponding to the direction and relative position of rotation of the encoder disc 51. The output signals of the detectors 53 and 54 are connected to a microprocessor or digital signal processor in order to create a "scratch effect". Alternatively, the output signals can connected to a microcontroller device disposed toward created a USB output signal or an 802.11 wireless signal where the signal is used to create a scratch effect within a personal computer.

Figure 8:
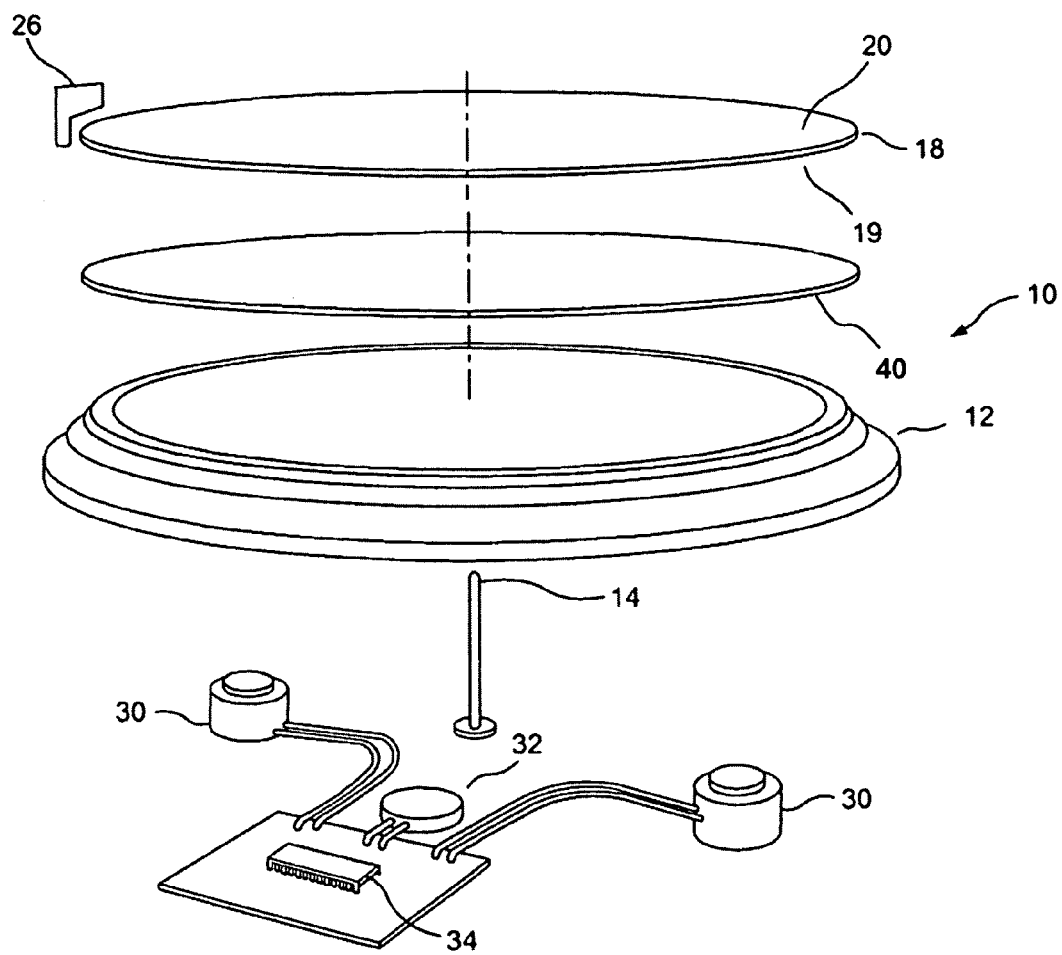
FIG. 8 is a partially exploded perspective view of an embodiment of the scratch controller of the present invention free of a driving motor.

FIG. 8 shows an embodiment of the present invention where the entire scratch effect producing mechanism is free of a driving motor. User manipulated disc 20 impinges against the upper surface of slip disc 40. The slip disc 40 is concentrically disposed against the upper surface of the rotating platter 12. Shaft 14 is concentrically coupled to user manipulated disc 20, slip disc 40 and rotating platter 12. In this embodiment of the present invention, the bottom of the shaft end is connected to a bearing in order to allow it to rotate freely. As previously described, the magnet 30 increase the force of urging on the user manipulated disc because the user manipulated disc 20 includes magnetic material. This has the affect of increasing the friction between the slip disc 40 and both the user manipulated disc 20 and the rotating platter 12.

Figure 9:
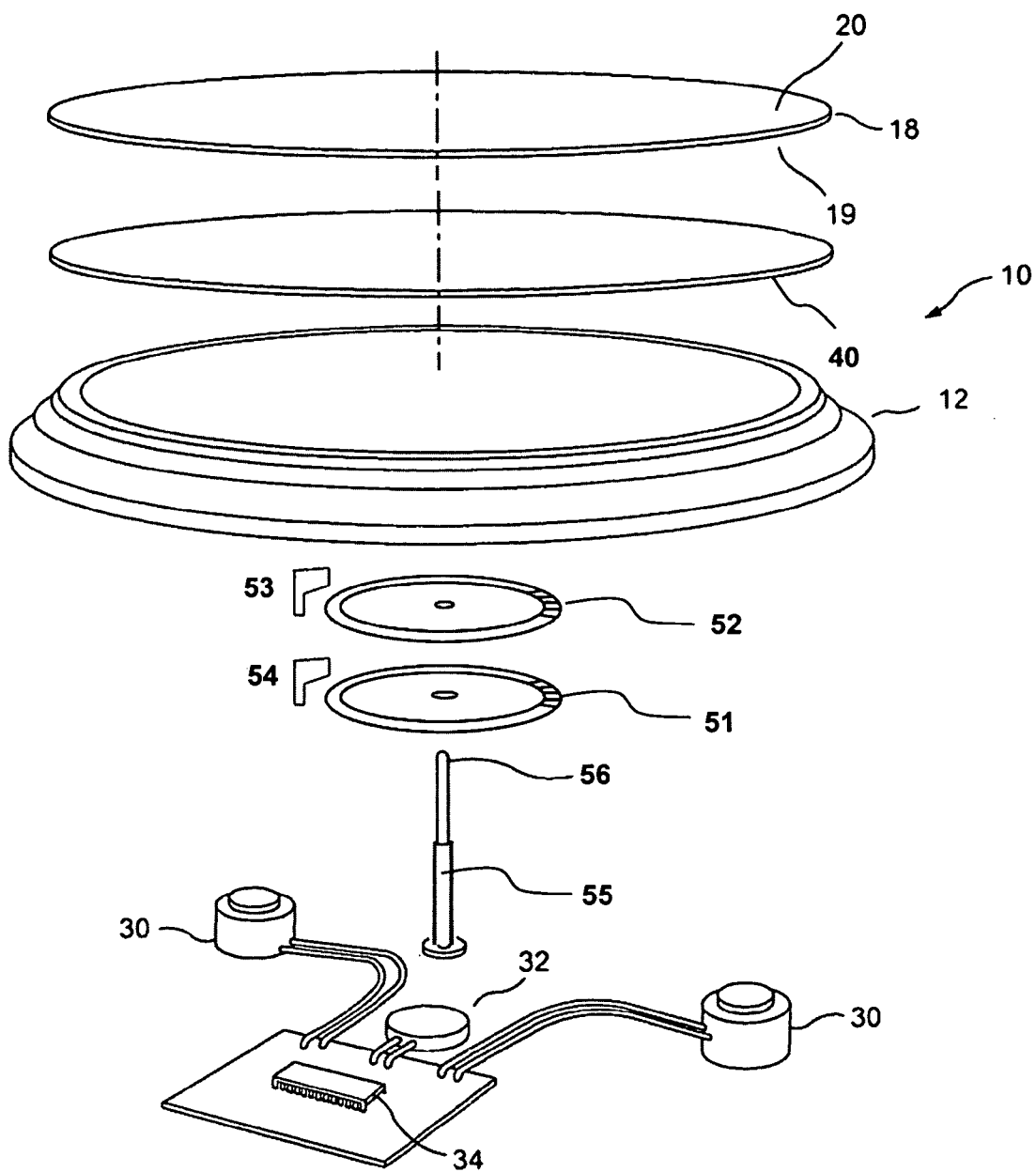
FIG. 9 is a partially exploded perspective view of an embodiment of the scratch controller of the present invention free of a driving motor and including an encoder disc operationally coupled to the user manipulated disc.

In FIG. 9, the user manipulated disc 20, slip disc 40, and rotatable platter are concentrically coupled to a dual concentric shaft. Shaft 56 is coupled to the user manipulated disc, shaft 55 is coupled to the rotating platter 12 and the slip disc 40. Optical encoder discs 51 and 52 are mounted to shafts 55 and 56 respectively. This has the affect of operationally coupling encoder disc 52 to the user manipulated disc and encoder disc 51 to the rotating platter. Detectors 53 and 54 detect the relative direction and position of encoders 52 and 51 respectively and there detect the relative direction and position of both the user manipulated disc 20 and the rotating platter 12. As previously described, magnet 30 increases the force of urging on user manipulated disc 20 because the user manipulated disc contains magnetic material. This has the effect of increasing the friction between both user manipulated disc 20 and the rotating platter 40. It may be desirable to only have a single encoder to detect rotation. In that circumstance, one of the encoder/detector combinations can be eliminated and the dual concentric shaft could be replaced with a single shaft.

Figure 10:
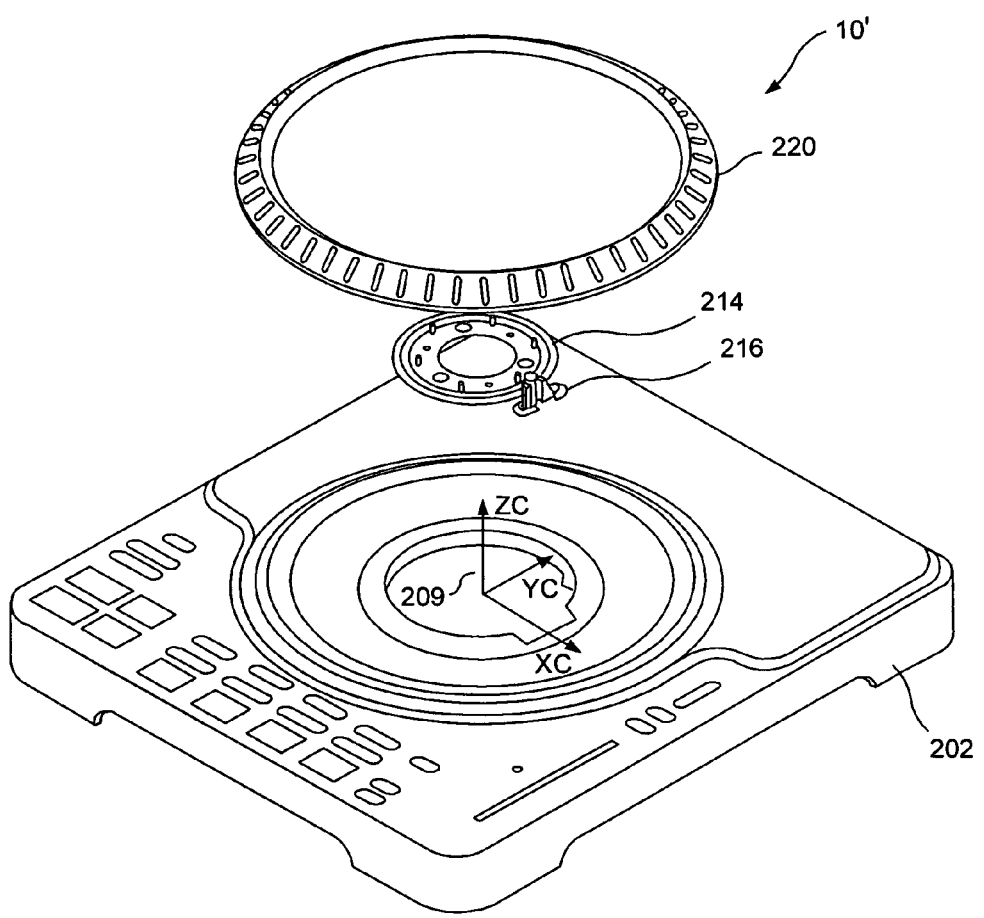
FIG. 10 is an exploded perspective view of an alternative embodiment of the scratch controller of the present invention showing a user manipulated rotatable platter.
Figure 11:
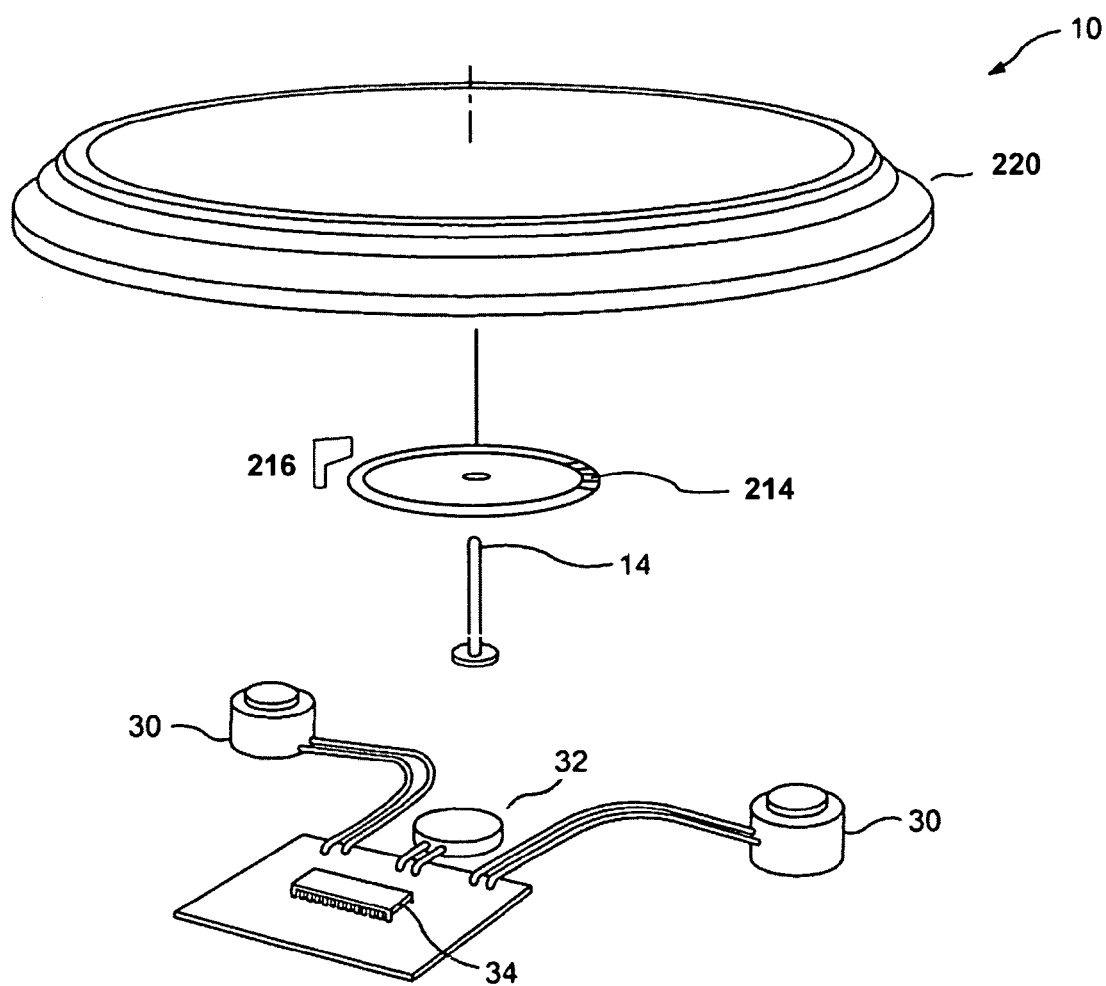
FIG. 11 is a partially exploded perspective view of the alternative embodiment of the scratch controller of the present invention of FIG. 10.

It is common on many disc jockey CD players, DVD players, and low cost controllers to have a single rotatable platter as the user manipulated surface without a separate user manipulated disc. This type of configuration does not contain a motor drive mechanism; the user creates all rotational movement associated with the rotatable platter. While this less accurately simulates the feeling of a real vinyl record on a phonographic turntable, it does have the several advantages including lower cost to implement and simpler operation. FIG. 10 shows an exploded perspective view of an alternative embodiment of the present invention where a rotatable platter 220 is mounted to a fixed base 202. FIG. 11 shows a partially exploded view of the same embodiment. Rotatable platter 220 is free of a driving motor. Instead, the rotatable platter 220 is mounted directly to shaft 14. The other end of shaft 14 rotates freely. This is typically accomplished with a bearing mounted to the fixed base 202. Encoder 214 is mounted to the shaft. This is typically an optical encoder, but other types are possible as long as they are able to provide relative position and direction information. In this embodiment of the present invention, detector 216 reads the relative position and direction information and converts this to an electrical signal, typically a quadrature output signal, as previously described. This signal is conveyed to a microcontroller where it is used to produce a scratch effect either in the device 10 itself or in a personal computer. The information can be relayed to the personal computer through a microcontroller, FPGA, digital signal processor, or other device disposed toward preparing data for transmission via a standard computer protocol such as USB or wireless 802.11.

Rotatable platter 220 contains magnetic material. By magnetic material we mean ferrous or other material that is magnetically attractive. In a typical embodiment of the present invention, the rotatable platter 220 can be made out of molded plastic with ferrous materials embedded within the plastic. Alternatively, the molded plastic platter may have radial members or other reinforcing structure made out of steel or another ferrous material. In another embodiment of the present invention, the platter may be made fully or partially made out of cast steel. In yet another embodiment, only the upper surface of the platter is made out of a ferrous material. There are clearly many ways in which to introduce magnetic materials into the rotatable platter 220 and anyone familiar with the art may recognize additional ways to accomplish this.

Electromagnet 30 in FIG. 11 increases the force of urging against rotatable platter 220 because of the previously mentioned ferrous or magnetically attractive material contained within the platter. As described previously, electromagnets 30 are mounted in a stationary position below rotatable platter 220 for increasing a force between the rotatable platter 220 (which is attracted to the electromagnets) and the fixed base 202. The strength of electromagnets 30 is adjustable to vary the friction between rotatable platter 220 and fixed base 202. The circuitry for adjusting the strength of electromagnets 30 is illustrated in FIG. 4 and its function and structure previously described.

Thus the several aforementioned objects and advantages are most effectively attained.

Although preferred embodiments of the invention have been disclosed and described in detail herein, it should be understood that this invention is in no sense limited thereby and its scope is to be determined by that of the appended claims.

What is claimed is:

1. A device for producing scratch effects in a digitized audio signal, comprising:
   a rotating platter which is free of motor driving;
   a user manipulated disc including magnetic material;
   a slip disc concentrically disposed against the upper surface of said rotating platter;
   said user manipulated disc impinging against the upper surface of said slip disc, rotating about a common axis with said rotating platter and being free of motor driving;
   at least one electromagnet spaced and with polarity oriented with respect to said user manipulated disc for attracting said user manipulated disc thereby increasing a force urging said user manipulated disc against said rotating platter; and
   a detector for detecting motion of said user manipulated disc and producing a scratch effect in response thereto.

2. The device of claim 1 further including a circuit for varying magnetic strength of said at least one electromagnet.

3. The device of claim 1, further including means for communicating with a computer or processor.

4. The device of claim 3 wherein means for communicating with the computer includes a USB interface.

5. The device of claim 3 wherein means for communicating with the computer includes wireless protocol.

6. The device of claim 1 wherein said upper surface of said user manipulated disc includes an optical encoding pattern.

7. The device of claim 1 wherein said lower surface of said user manipulated disc includes an optical encoding pattern.

8. A device of claim 1 further including an encoder disc operationally coupled to said user manipulated disc.

9. A device for producing scratch effects in a digitized audio signal, comprising:

a fixed base;

a rotatable platter mounted to said fixed base, said rotatable platter includes magnetic material and said rotatable platter is free of a motor driving, wherein the user creates all rotational movement with respect to said rotatable platter;

at least one electromagnet spaced and with polarity oriented with respect to said user manipulated rotatable platter for attracting said user manipulated rotatable platter thereby increasing a force urging said rotatable platter against said fixed based; and a detector for detecting motion of said rotatable platter and producing a scratch effect in response thereto.

10. The device of claim 9 further including a circuit for varying magnetic strength of said at least one electromagnet.

11. The device of claim 9, further including means for communicating with a computer or processor.

12. The device of claim 9 wherein said lower surface of said rotatable platter includes an optical encoding pattern.

13. A device of claim 9 further including an encoder disc operationally coupled to said rotatable platter.

* * * * *